Aug. 12, 1969  R. C. GROVER ET AL  3,460,277
TRANSPLANTER
Filed Dec. 27, 1965  5 Sheets-Sheet 2
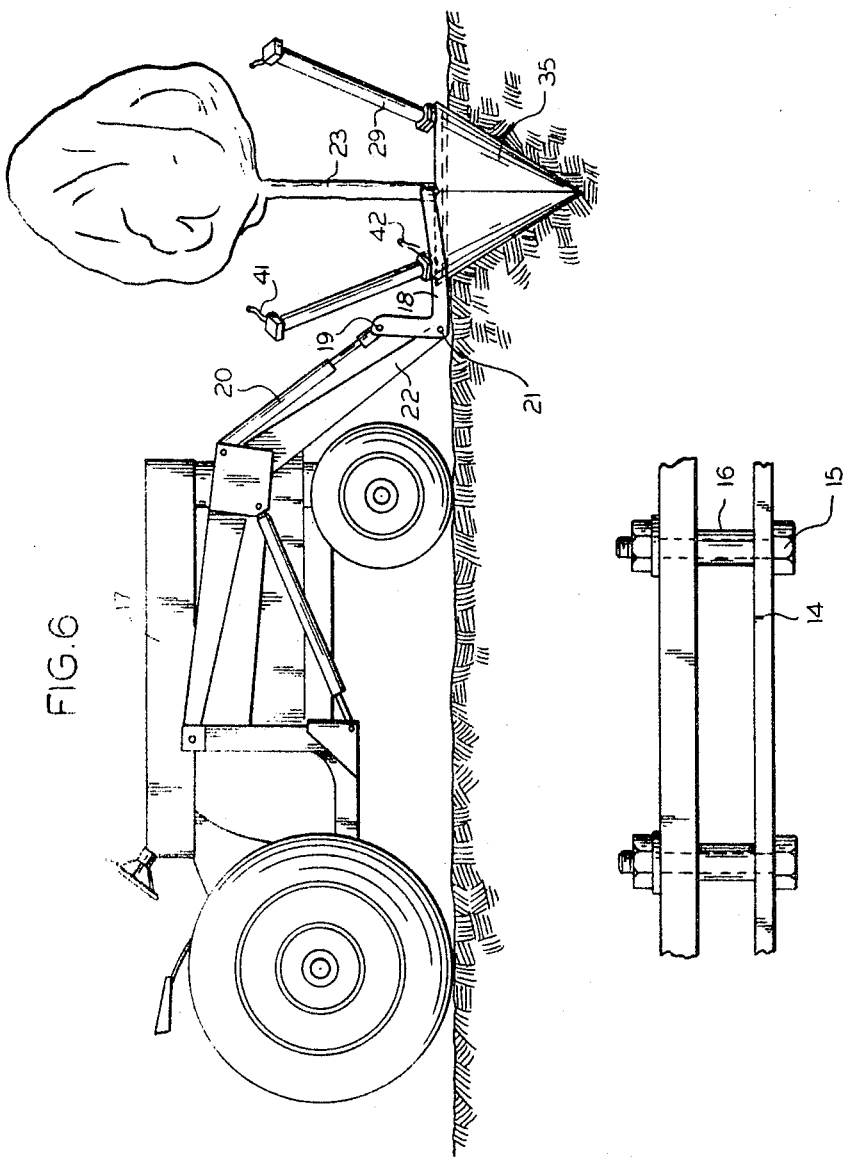
INVENTORS
RUSSELL C. GROVER
PHILLIP C. GROVER
BY
ATTORNEYS

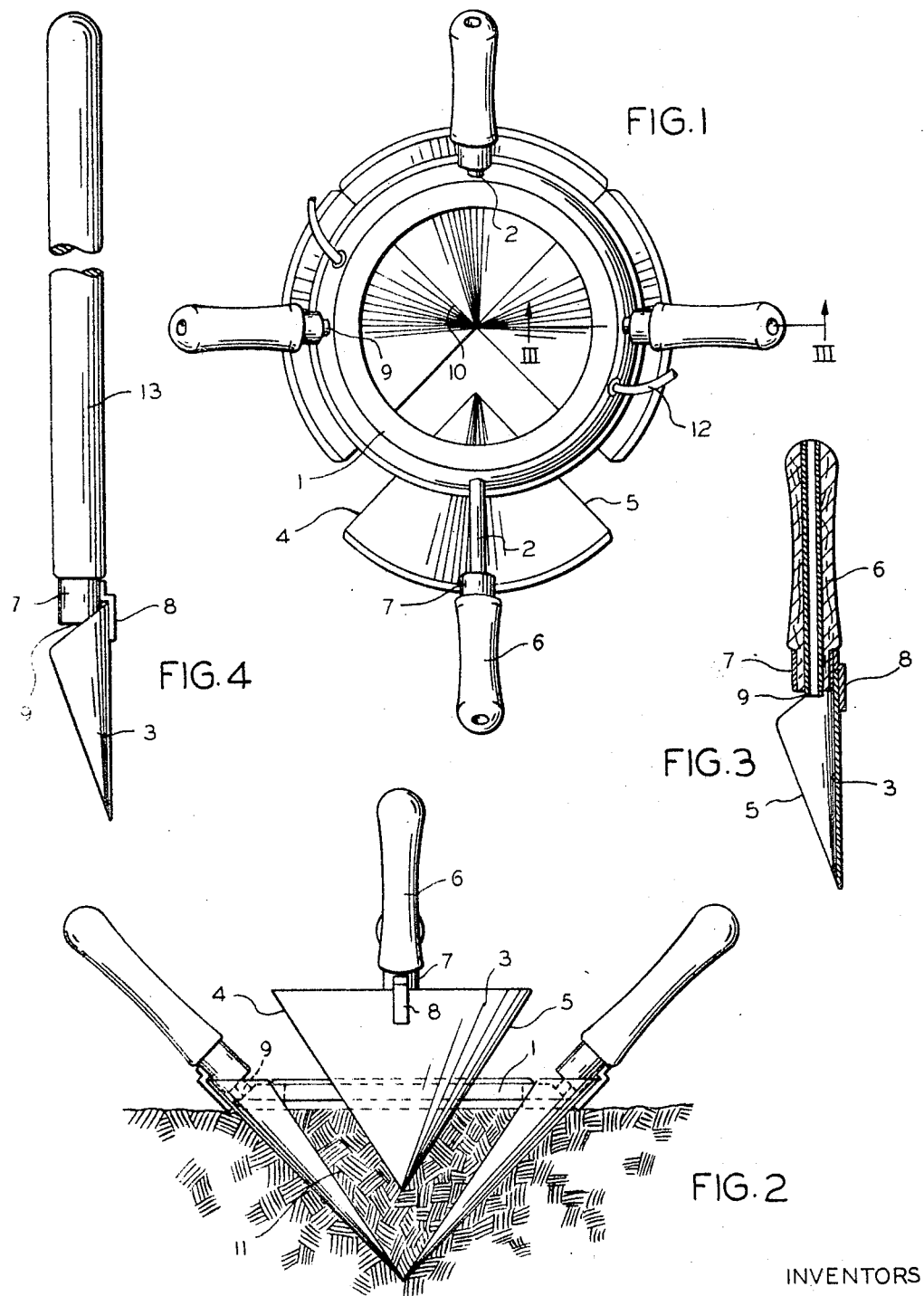

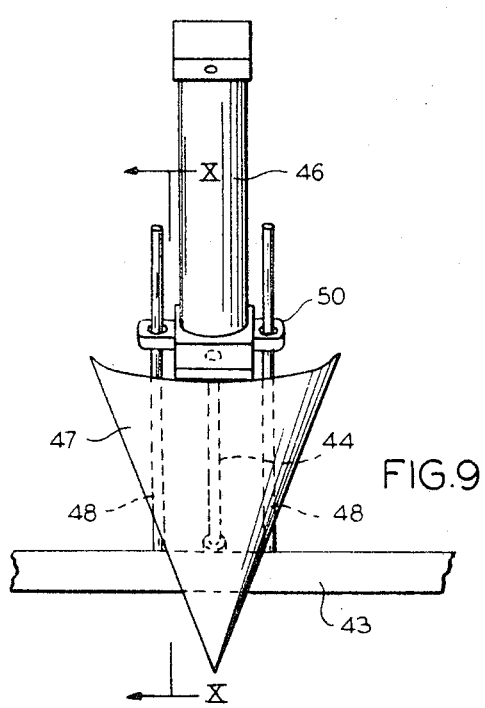
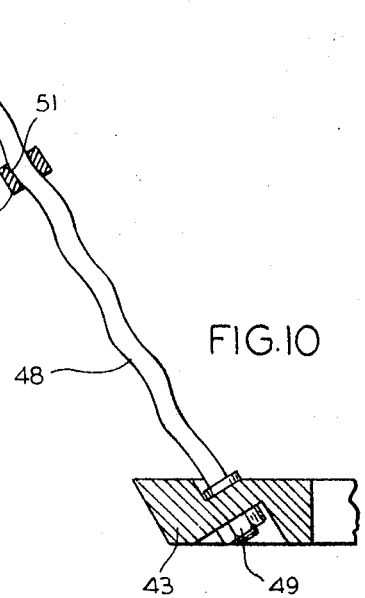
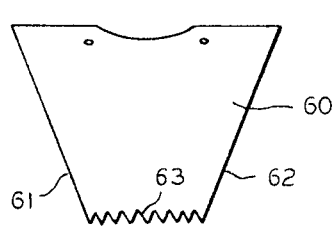
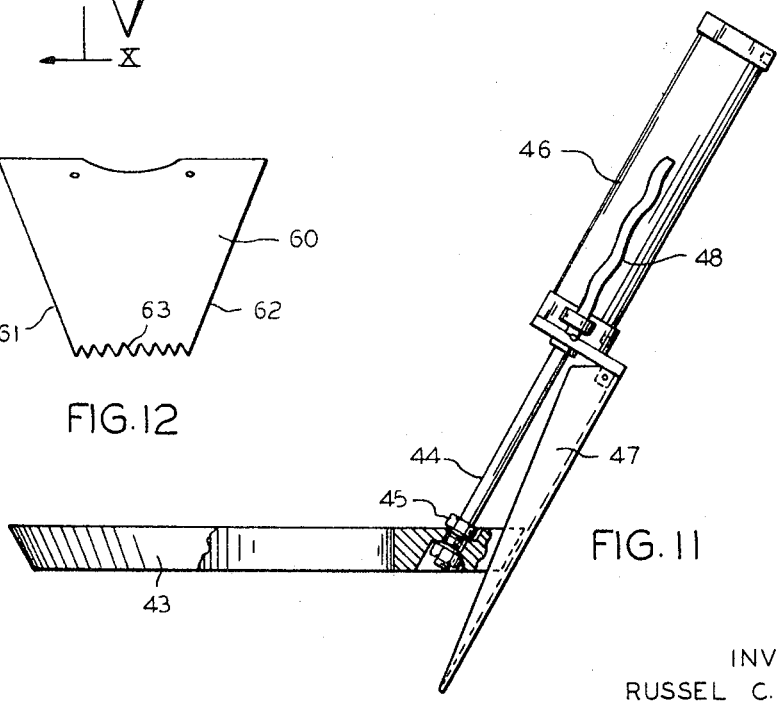

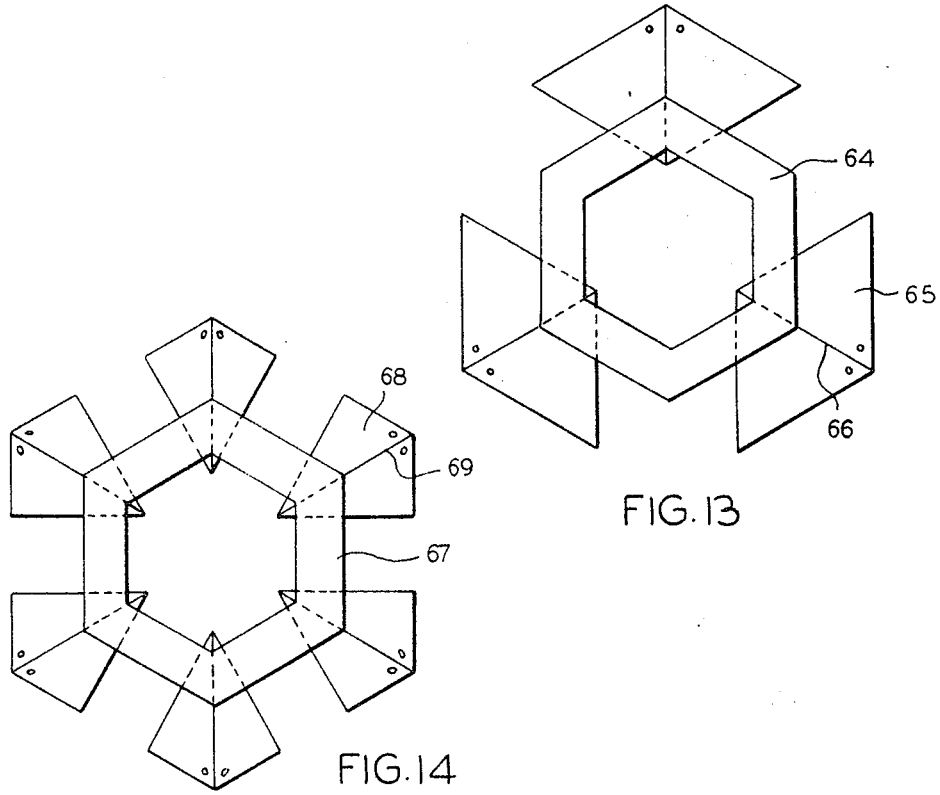
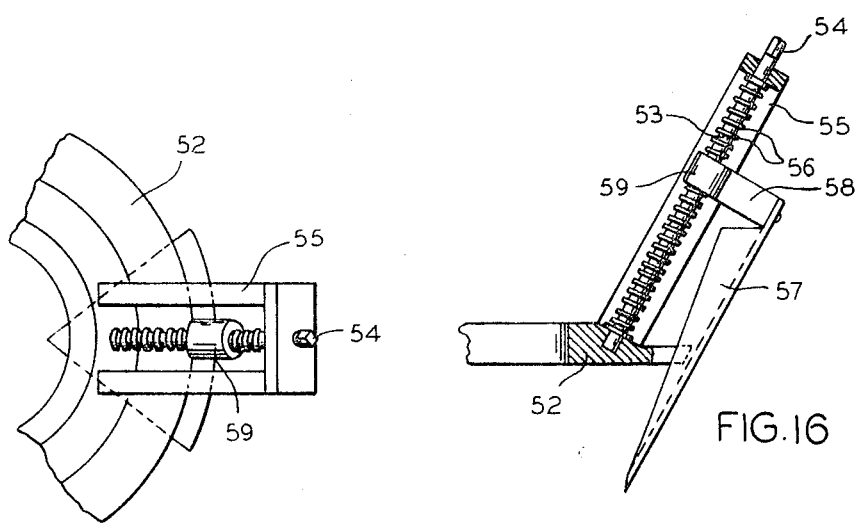

United States Patent Office 3,460,277
Patented Aug. 12, 1969

3,460,277
TRANSPLANTER
Russell C. Grover and Phillip C. Grover, both of R.R. 1, Box 101, Henry, Ill. 61537
Filed Dec. 27, 1965, Ser. No. 516,578
Int. Cl. A01g 23/06, 23/00, 1/00
U.S. Cl. 37—2                                                    9 Claims

ABSTRACT OF THE DISCLOSURE

A transplanter for transferring a growing plant, shrub, bush, tree or the like from one location to another, embodying apparatus including cutting blades which converge as they are forced into the ground around the plant to prune the roots of the plant and sever a mass of earth around the remaining roots and retain the plant and earth mass until the same is placed in the new location.

---

The instant invention may be made in numerous sizes from small manually operated transplanters to large transplanters carried by tractors or trucks for use in connection with trees, large bushes, and other plants requiring a mass of earth of such size that vehicle transportation thereof is necessary.

It is an important object of this invention to provide a transplanter provided with blades to enter the ground around the plant, sharply prune the roots of the plant while cutting a conical or pyramidal, these terms being used synonymously herein, mass of earth around the remaining roots of the plant and carrying that mass of earth and the plant in such a manner as to protect the roots from exposure to sun and air, keep them in a moist condition, and maintain the natural root to soil relationship of the plant, until it is placed in a new location.

Another object of this invention is the provision of a transplanter which may be adjusted to vary the quantity of earth removed along with a plant to be relocated, whereby the transplanter may be used with plants of various sizes.

Also an important feature of this invention is the provision of a transplanter including a plurality of downwardly tapering blades which enter the ground slantwise around the plant and converge each with the other until the side edges of the blades are brought into contiguity to define a conical mass of earth around the roots of the plants, and the blades hold that mass of earth and the plant until the plant has been relocated.

Another feature of the invention is the provision of a transplanter capable of providing a hole in the ground where it is desired to place a plant, and then sever a mass of earth of the same size as the hole around the roots of the plant, and carry both the mass of earth and plant to its previously provided location.

Still another desideratum of this invention is the provision of a transplanter including a plurality of blades having sharp side cutting edges, the blades converging in use until the cutting edges are in contiguity, provision being made for lengthening the strokes of the blades after resharpening to preserve the desired contiguity for removal of a plant.

It is also an object of this invention to provide a transplanter embodying a plurality of cutting blades so arranged and guided as to converge during their downward stroke into the earth and thus sever a mass of earth around the roots of a plant, there being means provided to oscillate or agitate each blades during its downward movement.

A further object of this invention is the provision of a transplanter which is economical to manufacture and use, highly durable, simple in operation, and extremely efficient both as to mechanical operation and plant protection.

Also a feature of the invention is the provision of a transplanter capable of severing a mass of earth around the roots of a plant and maintaining that mass of earth under a desired degree of compactness during transference of the earth and plant to a new location.

While some of the more salient features, characteristics and advantages of the instant invention have been above pointed out, others will become apparent from the following disclosures, taken in conjunction with the accompanying drawings, in which:

FIGURE 1 is a fragmentary top plan view of a manually operable transplanter embodying principles of this invention;

FIGURE 2 is a fragmentary side elevation of the structure of FIGURE 1 associated with the ground;

FIGURE 3 is a central longitudinal section through one of the blade assemblies taken substantially as indicated by the line III–III of FIGURE 1, looking in the direction of the arrows, but positioned vertically;

FIGURE 4 is a fragmentary side elevational view of a blade assembly designed for foot operation;

FIGURE 5 is a fragmentary side elevational view illustrating how the transplanter may be adjusted to vary the quantity of earth removed with a plant;

FIGURE 6 is a somewhat diagrammatic fragmentary side elevational view illustrating a mechanically operated transplanter embodying principles of this invention operatively associated with a lift truck;

FIGURE 9 is a fragmentary showing of one form of means for oscillating a blade during its travel in the earth;

FIGURE 10 is a fragmentary sectional view taken substantially as indicated by the line X—X of FIGURE 9;

FIGURE 11 is a side elevational view, with parts in section, of the structure of FIGURE 9;

FIGURE 12 is a front view of a type of blade usable with the instant invention in the event it is desirable to provide a frustum-shaped mass of earth around the roots of a plant;

FIGURE 13 is a diagrammatic illustration indicating how three blades may be employed in the instant invention;

FIGURE 14 is a diagrammatic illustration indicating how six blades may be utilized if desired;

FIGURE 15 is a fragmentary plan view showing a different form of mechanism for both driving the blade and oscillating the same; and FIGURE 16 is a fragmentary part sectional part side elevational view of the structure of FIGURE 15.

AS SHOWN ON THE DRAWINGS

Figure 7:
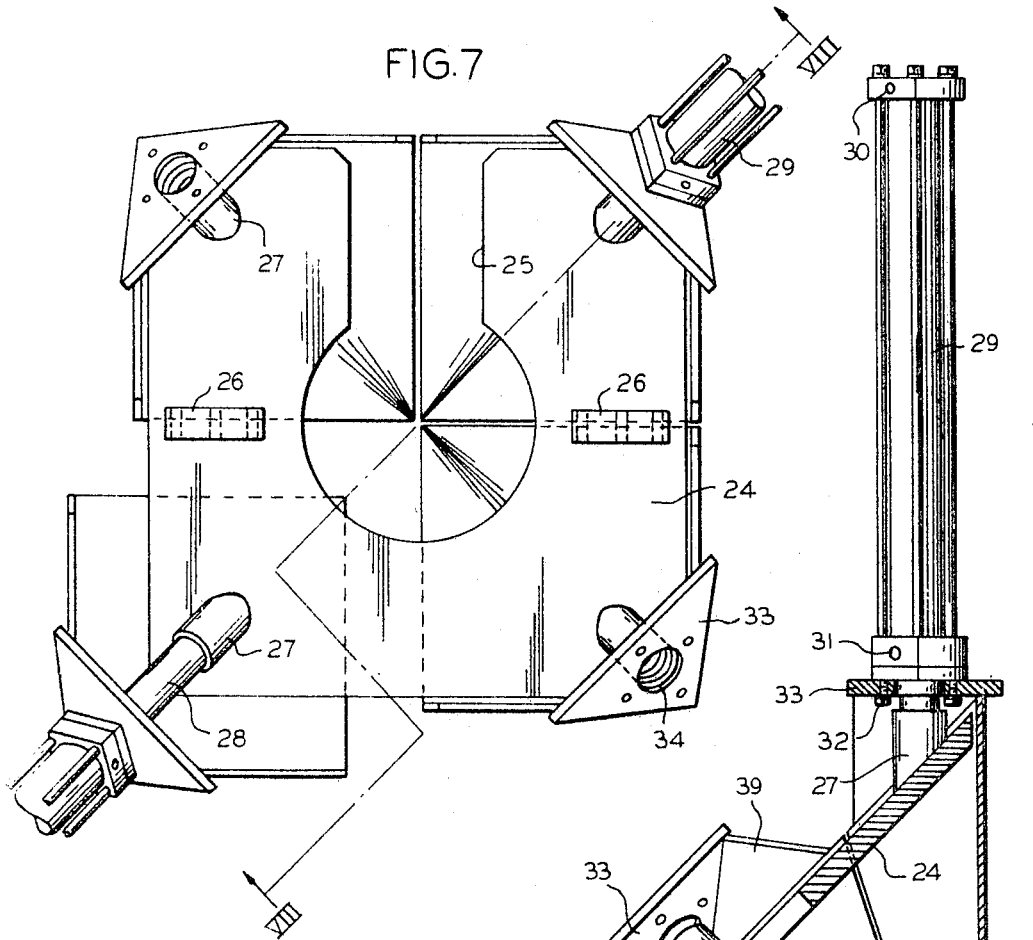
FIGURE 7 is a fragmentary plan view of the transplanter of FIGURE 6.

The first illustrated embodiment of the instant invention, seen in FIGURES 1, 2 and 3, comprises a base or ground ring 1 which is disposed on the ground around a plant to be transplanted, preferably with the bole of the plant as nearly as possible at the center of the ring. Welded or equivalently secured to the ring at their lower ends is a plurality of upwardly extending guide rods 2, there being four of these guide rods in the illustrated instance, evenly disposed around the ring. These guide rods project upwardly and outwardly at an angle to the horizontal, and an angle approximately 45° has been found quite satisfactory. A blade assembly is provided for each guide rod, and all the blade assemblies are identical.

Each of these blade assemblies comprises a pointed cutting blade 3 formed with a curvature as though cut from a cylindrical shell, and the blade has sharpened knife edges 4 and 5 at the opposite sides thereof. The blade is preferably made of metal capable of retaining a sharp cutting edge for a long period of time. An operating handle 6, satisfactorily made of wood, is provided at its lower end with a ferrule 7 and a bracket 8 integral with that ferrule extends downwardly over the outer face of the blade to which it may be spot welded or equivalently secured. As seen best in FIGURE 3, the handle is provided with a longitudinal aperture therethrough in which is inserted a hollow guide sleeve for engagement over the respective guide rod 2 on the base plate. The lower end 9 of the guide sleeve preferably projects below the lower end of the handle 6 so as to limit the downward stroke of the blade by contacting the base ring 1.

The blades are preferably forced into the ground by hand and follow a slantwise path in accordance with the angle of the guide rods. The blades may be forced into the ground one at a time or two at a time as the operator may deem desirable. In the illustrated showing three of the blades have been forced into the ground to their full extent, and the fourth blade is shown at approximately half its depth. When the blades have reached full depth, the side cutting edges are in contiguity as indicated at 10 in FIGURE 1. The degree of contiguity is not sufficient for the cutting edges of the blades to be injured, and the blades are stopped by contact of the extended portion of the guide sleeve with the base ring.

When the blades have all been inserted they have severed a conical mass of earth around the roots of a plant, as seen best in FIGURE 2. During their downward stroke, the blades sharply prune outwardly extending roots of the plant and the contiguity of the blades is such as to seal off the mass of earth 11 from ambient air and sunshine, thus portecting the plant roots, and at the same time maintaining the natural root to soil relationship. After the blades have been inserted it is a simple expedient to grasp a bail 12 or other handle means secured to the base ring and pick up the entire apparatus including the mass of earth 11 and the plant growing therein. The earth and plant may then be transferred to the new location.

Previously to the removal of the plant and earth, the same transplanting apparatus will have been used to provide a hole in the ground of a size to nicely accommodate the earth mass 11 which has been maintained in its natural moist condition during the transfer. It will be noted, also, that the ring is disposed inside the blades and aids in confining the earth, thereby maintaining the natural compactness of this mass of earth during transfer, and the operator may press upon this ring after transfer to further compact the earth around the plant.

Once the transfer has been made, the apparatus is deposited in the receiving hole, and it is a simple expedient to withdraw the blades and then lift up the base ring, leaving the mass of earth and plant in its new location.

Should the cutting edges of the blades become dull after a period of usage and require resharpening, this may easily be accomplished since each blade is completely removable for cleaning or resharpening whenever desired. Resharpening of the blades may cause a slight reduction in size and a slight lessening, therefore of the downward stroke of the blade. To compensate for this, the protruding portion 9 of the guide sleeve in each blade assembly may be filed off sufficiently to insure the desired contiguity of the blade edges at full depth. By virtue of the guide rods, each blade must travel the same straight and accurate path as every other blade.

For large sized plants where it may be easier to force a blade into the ground with the foot, blades with longer handles may be provided as seen in FIGURE 4. In this instance, the same blade construction as above described is provided, but the blade assembly includes a longer handle 13 whereby the operator may stand up, and press with his foot upon the upper edge of a blade to force it into the ground. The handle 13 is provided with an internal guide sleeve the same as above described and of a length in accordance with the length of the guide rods 2.

If it is desired to vary the amount of earth severed by the blades to better accommodate smaller plants, it is a simple expedient to adjust the transplanter by bolting or equivalently attaching an elevator ring 14 beneath the base ring 1, as seen in FIGURE 5. Bolt assemblies 15 may pass through suitable apertures in both the base ring 1 and the elevating ring 14 with a spacer sleeve 16 of desired length disposed around each bolt between the rings 1 and 14. The elevator ring 14 then functions as the base ring, and the base ring is elevated above the ground a distance comprising the length of the spacer sleeve plus the thickness of the elevator ring. The blade assemblies are operated in the manner above described, with the exception that a lesser quantity of earth is severed. It will be apparent that spacer sleeves of various lengths may be provided, whereby one transplanter may accommodate plants through a relatively wide range of sizes.

Figure 8:
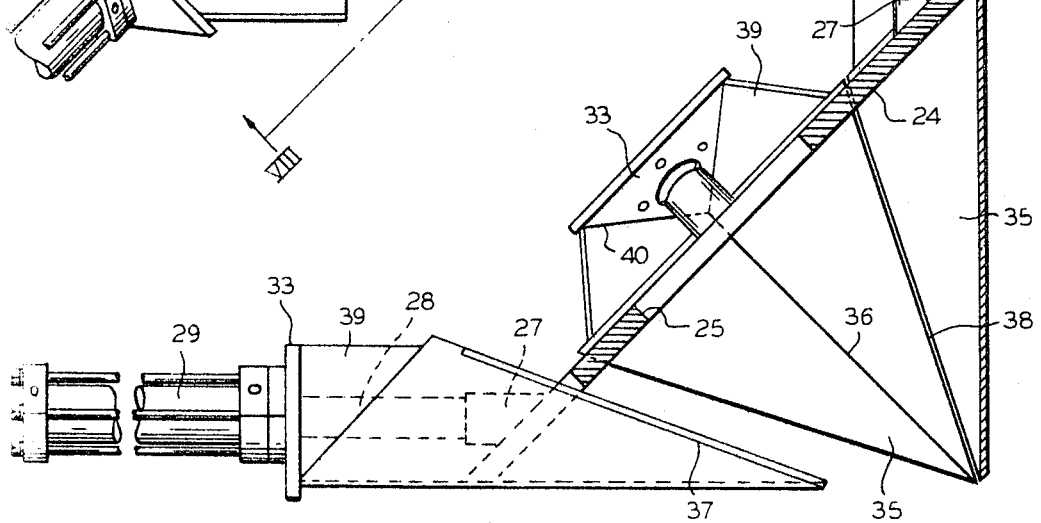
FIGURE 8 is a fragmentary sectional view taken substantially as indicated by the staggered section line VIII—VIII of FIGURE 7, with parts shown in elevation.

In FIGURES 6, 7 and 8 we have illustrated a transplanter of a large size which may be attached to a suitable occupational vehicle for the transplanting of trees, large bushes, and the like. With reference to FIGURE 6, it will be seen that this form of the invention may be attached to a lift truck 17 at either end of the truck as the case may be. Attachment may be made on each side of the respective truck end by means of an angle member 18 pivoted at one end as at 19 to a hydraulic lifting arm 20, and pivoted adjacent its apex as at 21 to a lift arm 22. The other end of the angle member 18 is secured to the base ring of the transplanter. With this arrangement, the transplanter may be used to sever a relatively large mass of earth around the roots of a larger plant such as a tree 23 which may be then transferred with the roots fully protected to its new location for replanting.

To illustrate variance that may be had in blade shape, in the instance of FIGURES 6 and 7 we have shown blades each of which is centrally bent so as to define a quadrant portion of a square pyramid. Each of the four blade assemblies is identical with every other.

In this instance, a base plate 24 of generally square shape is provided, and since it may be impossible to lower the base plate over the branches of a tree, a keyhole slot 25 opening inwardly from one side of the base plate is provided permitting the base plate to be moved laterally past the bole of a tree until the tree bole is centered in the larger head portion of the slot 25 and thus located centrally of the plate 24. The plate 24 is provided with opposed mounting lugs 26—26 for engagement with the angle members 18—18 on the lift truck 17. And the keyhole slot opens from the side of the base plate farthest away from the truck.

In this instance, an internally threaded mounting boss 27 is welded at its lower end to the base plate adjacent each corner thereof. The mounting boss is disposed at an angle to the base plate, and here again an angle approximating 45° has been found satisfactory. A piston rod 28 has its lower end threadedly engaged in each mounting boss and is accordingly retained in fixed position. A double acting hydraulic cylinder 29 encases the outer portion of the piston rod, it being understood that the rod carries a piston of a known type. In this instance, the piston remains stationary and the cylinder in response to directed hydraulic pressure reciprocates along its longitudinal axis relatively to the piston. As is usual in the case with a hydraulic ram, each cylinder is provided with fluid ports 30 and 31 at opposite ends thereof. Secured to the lower end of each cylinder, as by one or more bolts 32, FIGURE 8, is a triangular spade thrust plate 33, this plate being centrally apertured as indicated at 34 to permit the piston rod to extend therethrough.

Each blade assembly includes a blade 35 bent along its center line as at 36 in the working portion of the blade. Along each side edge of the blade there is a sharpened cutting edge 37, and, as indicated at 38, adjacent side edges of blades are in contiguity when the blades are at full depth.

As seen best in FIGURE 8, each blade has an integral top formation 39 above the working portion of the blade. This top formation is shaped so as to provide an angular seat as indicated at 40 beneath the respective thrust plate 33, and the thrust plate is welded to the blade formation 39 along the seat 40. Thus, each blade must move upwardly or downwardly with its respective hydraulic cylinder 29.

The entire transplanter is secured to a lift truck as previously described, and suitable flexible connections as diagrammatically indicated at 41 and 42 in FIGURE 6 are connected to hydraulic mechanism on the truck in a known manner for the actuation of the cylinders 29.

In operation, this form of the invention is extremely simple and highly effective. With all the blades elevated the truck is maneuvered to cause the ground plate 24 of the transplanter to receive the bole of the plant in the keyhole slot 25, and the plate is forced firmly against the ground by hydraulic pressure supplied by the lifting arms of the truck. This method results in the entire front wheel load being placed upon the base plate. Two opposing blades are then thrust into the ground to about half depth to firmly anchor the base plate against any shifting of its proper location. Next, the two remaining opposite blades are thrust full depth into the ground and the stroke of the first two blades is then completed to full depth, severing a pyramidal mass of earth around the roots of the plant, excess portions of those roots having been cleanly severed by the blades. The entire mass of earth including the plant is then elevated and transported to its new location by the truck, where a hole of the proper size had been previously prepared with the transplanter. During transport, it will be noted that the roots are fully protected, the natural root to soil relationship has not been disturbed, and the earth is maintained compacted. When the plant has been seated in its new location, the blades are withdrawn and hydraulic pressure exerted upon the ground plate 24 to compact the earth around the roots of the tree.

With this form of the transplanter, the amount of earth severed may be altered at will by the use of an elevated plate 14 as above described in connection with FIGURE 5.

Many times it is desirable to oscillate or wiggle the blades, especially if they are being used in hard ground. One suitable arrangement for accomplishing this is seen in FIGURES 9, 10 and 11. Here, a base plate or ring 43 may have a plurality of piston rods 44 pivotally bolted or otherwise secured thereto as indicated at 45 so that each rod 44 may rock relatively to the base plate 43. A double acting hydraulic cylinder 46 may move up and down the piston rod as above described. Each hydraulic cylinder carries a suitable blade 47 of any desired shape. On each side of a piston rod 44 a guide rod 48 may be bolted or equivalently secured at its lower end to the ring or plate 43 as indicated at 49. It will be especially noted that each of these guide rods is undulated as seen clearly in FIGURES 10 and 11. An apertured ear extending laterally from the lower end of the respective cylinder 46 is engaged over each guide rod and from the showing in FIGURE 10 it will be noted that the aperture in the ear is defined by a curvate or convex wall 51 to facilitate smooth action. With this arrangement, as the blade is driven into the ground by hydraulic pressure, the guide rods will cause an oscillatory movement of the blade. Depending upon the direction of undulations in the guide rod the oscillatory movement may be toward and away from the base plate or ring, or back and forth laterally, as may be desired depending upon ground conditions. Such oscillation or wiggling of each blade renders it easier to drive the blade into the ground and sever relatively large roots. Another mechanism for driving and oscillating or wiggling a blade is shown in FIGURES 15 and 16. In this instance a base ring 52 is provided with an obliquely upstanding rotary jackscrew 53 for each blade. At the upper end thereof this jackscrew is provided with a polygonal formation for engagement by suitable driving means, and this formation projects through the upper end of an inverted U-shaped frame 55 which holds the jackscrew in place, the legs of this frame being welded or equivalently secured to the base ring. It will be noted that the teeth 56 of the jackscrew are eccentric relatively to the axis of the jackscrew, extending farther to one side of this axis than the other. Each blade 57 is carried on a bracket 58 having an enlarged end 59 embracing the jackscrew. As the jackscrew is rotated and the bracket part 59 moves therealong, the blade is oscillated or wiggled during its travel.

Should it be desirable to remove a frustum of earth around the roots of a plant, a blade 60 of the character shown in FIGURE 12 may be substituted for each of the other blades. Such a blade is foreshortened and is preferably provided with sharp and cutting edges 61 and 62 at the sides thereof and in this instance can also be provided with a sharpened serrated cutting edge 63 across the bottom end of the blade. Of course, contiguity between blades would not be established with blades of this character down to a point, but in many types of ground contiguity along the side edges of the blade would be sufficient to hold a frustum of earth against dropping through at the bottom ends of the blades.

To indicate that the blades may be of various shapes as may be desired, in FIGURE 13 we have shown diagrammatically hexagonal base ring 64 with which three blades 65 may be utilized, each blade being bent along its central line at 66. Blades of this configuration will sever a hexagonal pyramid of earth around the roots of a plant when brought into contiguity at full depth.

In FIGURE 14 we have shown a similar hexagonal base ring 67 with which six blades of smaller size than the blades 65 may be associated the blades being mounted at the respective angles of the ring. Each blade 68 is bent in the center as at 69, and when these blades are brought into contiguity at full depth, they will have severed a hexagonal pyramid of earth around the roots of a plant. Many other variations in size and shape of blades will be apparent to those skilled in the art.

From the foregoing, it is apparent that we have provided highly versatile and efficient transplanting means for the replacing of large and small plants, the transplanting apparatus being capable in and of itself of severing a mass of earth around the roots of a plant, sharply pruning the longer roots, lifting the earth and plant out of the ground and fully protecting the roots against sun and air while maintaining both compactness and the natural root to soil relationship, transporting the plant to its new location, and depositing it in a hole previously made by the transplanting apparatus. The hands of the operator need never come in contact with the plant itself or the earth surrounding its roots.

It will be understood that modifications and variations may be effected without departing from the scope of the novel concepts of the present invention.

We claim as our invention:

1. In a transplanter, a peripheral base member having a flat under face to rest directly on the outer peripheral margin of the earth to be removed around a plant, a plurality of cutting blades having sharpened side edges and tapering substantially to a point, means for forcing said cutting blades slantwise into the ground adjacent said base member each into contiguity with adjacent blades to sever a mass of earth around the roots of a plant, said base member being totally inside said blades when the blades are in the ground, and means connecting said blades to said base member to be lifted along with the base member while carrying the severed earth and plant, comprising a plurality of guide rods evenly spaced and each secured to said base member at its lower end and sloping upwardly and outwardly above said base member, and means connected to each said blade for riding the respective guide rod.

2. In a transplanter,
a base ring for disposition on the ground around a plant,
a plurality of guide rods evenly spaced and each secured at is lower end to said base ring,
said guide rods sloping upwardly and outwardly above said base ring,
a cutting blade outside said ring for each said guide rod,
a handle connected to each blade and hollowed to ride over the respective guide rod while forcing the blade into the ground into contiguity with adjacent blades.

3. A transplanter, as recited in claim 2, wherein said handles are each of sufficient length to permit an operator to hold the same while stepping on the blade to assist in forcing the same into the ground.

4. A transplanter as set forth in claim 2, characterized by
a guide sleeve in a hollow in each said handle to ride over the respective guide rod while forcing the blade into the ground,
each said guide sleeve projecting below its handle to limit the stroke of the blade by contact with said ring, whereby said projecting portion of the guide sleeve may be filed off to compensate for loss of stroke when said blade is sharpened.

5. In a transplanter,
a base member for disposition on the ground around a plant,
a plurality of guide rods evenly spaced and each secured to said base member at its lower end,
said guide rods sloping upwardly and outwardly above said base member,
a plurality of cutting blades,
said guide rods being in the form of piston rods,
double acting power actuated cylinders movable relatively to said guide rods, and
means connecting said blades to said cylinders for forcing blades into the ground.

6. A transplanter as set forth in claim 5, and
means for connecting said base plate to lifting mechanism on a power vehicle.

7. In a transplanter,
a base plate having an opening therein to receive the bole of a plant and disposable on the ground,
a plurality of evenly spaced mounting bosses secured to said base plate and upstanding therefrom at an upward and outward slant,
an elongated member having the lower end thereof connected in each said boss,
a power driven member reciprocable along each said elongated member,
a thrust plate removably connected to the lower end of each said power driven member, and
a cutting blade secured to the underside of each said thrust plate to be forced by the respective driven member into the ground into contiguity with adjacent blades.

8. A transplanter as set forth in claim 7 wherein
said cutting blades each have a shape complemental to the adjacent part of said base plate and tapering downwardly to substantially a point to sever a pyramidal mass of earth around the roots of the plant, and
means to connect said base plate to lifting mechanism on a power vehicle.

9. In a transplanter, a base member for disposing on the ground around a plant, a plurality of cutting blades each having sharpened side edges and shaped complementally to said base member and tapering substantially to a point, means for forcing said cutting blades slantwise into the earth adjacent the outside of said base member whereby the blades will converge into contiguity beneath said base member, and adjusting means selectively attachable to the underside of said base member to elevate the same, whereby said blades will remove a lesser amount of earth around the roots of a small plant, said adjusting means comprising spacer sleeves of a desired length, and an elevcator member secured to the underside of said base member through said spacer sleeves to rest on the ground in lieu of said base member.

References Cited
UNITED STATES PATENTS

| | | | |
|---|---|---|---|
| 2,769,278 | 11/1956 | Wassell et al. | 37—2 |
| 1,599,841 | 9/1926 | Sager | 37—2 |
| 2,243,955 | 6/1941 | Gwathmey et al. | 37—2 |
| 2,313,604 | 3/1943 | Vogel | 37—2 |
| 3,191,982 | 6/1965 | Goalard | 37—2 |

ROBERT E. PULFREY, Primary Examiner

E. H. EICKHOLT, Assistant Examiner

U.S. Cl. X.R.
111—2; 172—371